Jan. 16, 1962  I. W. DUVALL  3,017,134
MOTOR DRIVEN FISHING REEL DEVICE
Filed Dec. 1, 1959  2 Sheets-Sheet 1

*INVENTOR.*
IVO W. DUVALL
BY Jerome Bauer
ATTORNEY.

Jan. 16, 1962   I. W. DUVALL   3,017,134
MOTOR DRIVEN FISHING REEL DEVICE
Filed Dec. 1, 1959   2 Sheets-Sheet 2

INVENTOR.
IVO W. DUVALL
BY *Jerome Bauer*
ATTORNEY.

United States Patent Office 3,017,134
Patented Jan. 16, 1962

3,017,134
MOTOR DRIVEN FISHING REEL DEVICE
Ivo W. Duvall, 9 Maple St., Amityville, N.Y.
Filed Dec. 1, 1959, Ser. No. 856,393
15 Claims. (Cl. 242—84.44)

This invention relates to a motor driven fishing reel device.

In the art of deep sea fishing, once a fish is "hooked" or caught on the line it is the practice to play with it until such time as it may be thoroughly exhausted from fighting. To enable this to be done effectively, it is necessary to provide the fisherman with a reel that may be operated quickly to wind in the fishing line so that the play or slack in the line may be taken up. In the past the take-up or winding-in of the slack of the fishing line and the application of dragging or braking forces to the fishing line were accomplished by hand manipulations on the reel hand crank itself. These movements tended to more quickly tire the fisherman than it did the fish caught at the other end of the line. Hence, the purpose of the present invention is to provide a fishing reel that may be operated quickly and easily by the use of a motor operated mechanism.

It is another object of the invention to provide a device that is unique in construction wherein the motor operator is enclosed within a portion of the reel and a novel arrangement of transmission structure permits the desired control of movements of the reel structure.

Another object of the invention is to provide a fishing reel device in which rotation may be transmitted from the motor to the reel spool by the use of a clutch mechanism that will release the transmission when the force exerted by the fish on the line is greater than the rotative force of the motor transmitted to the reel spool.

Still another object of the invention is to provide a device in which means operate to apply a braking force to restrain the rotation of the reel spool and releases such restraint when a force applied by the fish to the line is greater in opposition than the braking force.

A further object of the invention resides in its simplicity of construction and its unique arrangement of details permitting the same to be manufactured inexpensively and enabling its simple operation. Accordingly, a feature of the invention resides in the provision of a hand crank that may be operated to rotate the reel spool manually in the event of an electrical or motor failure and in a transmission structure that permits free wheeling of the reel spool.

Figure 1:
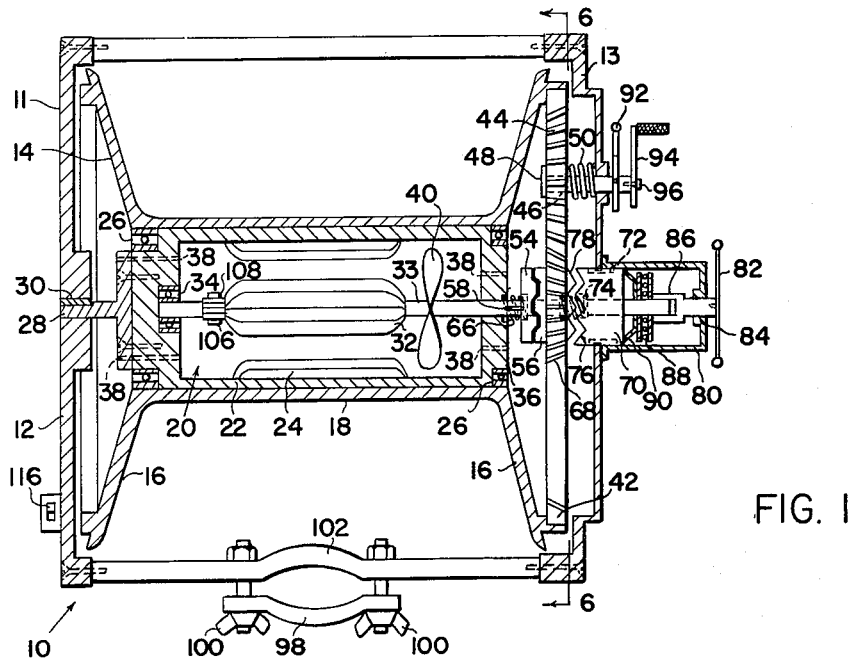
Figure 6:
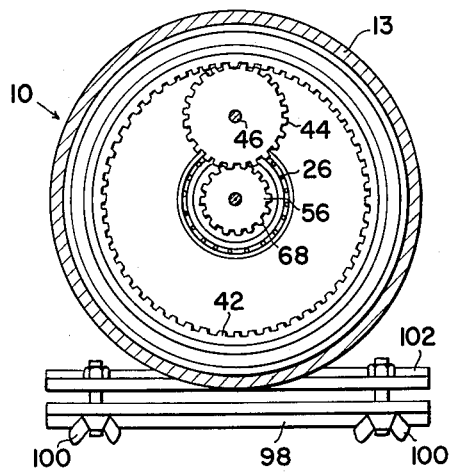
Figure 5:
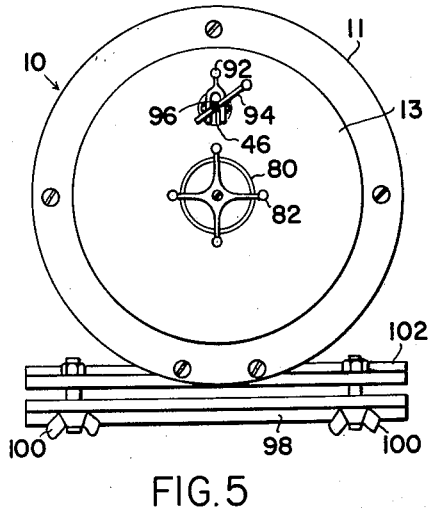
Figure 7:
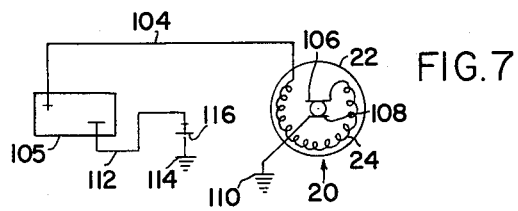
Figure 3:
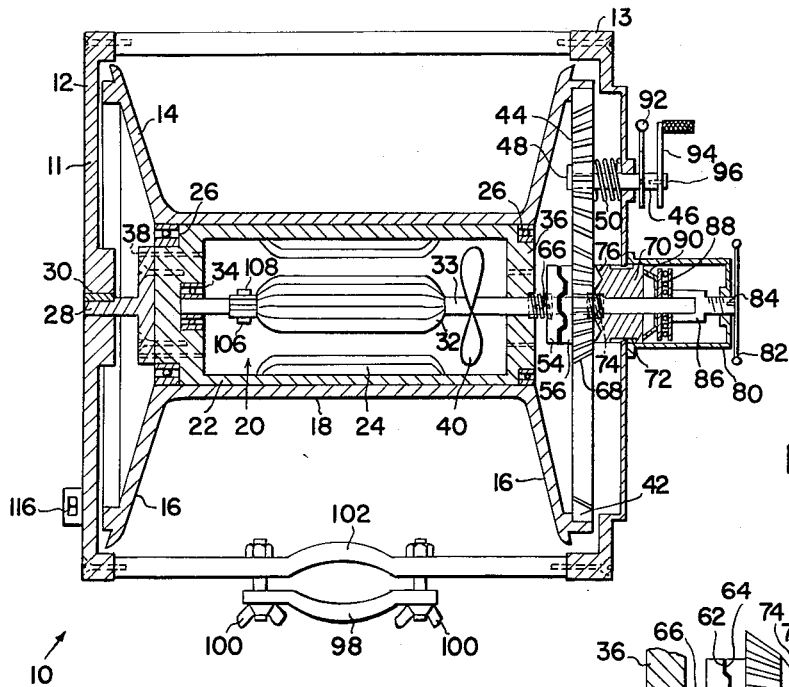
Figure 2:
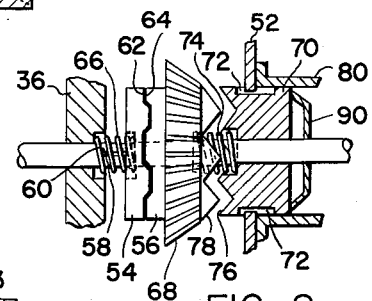
Figure 4:
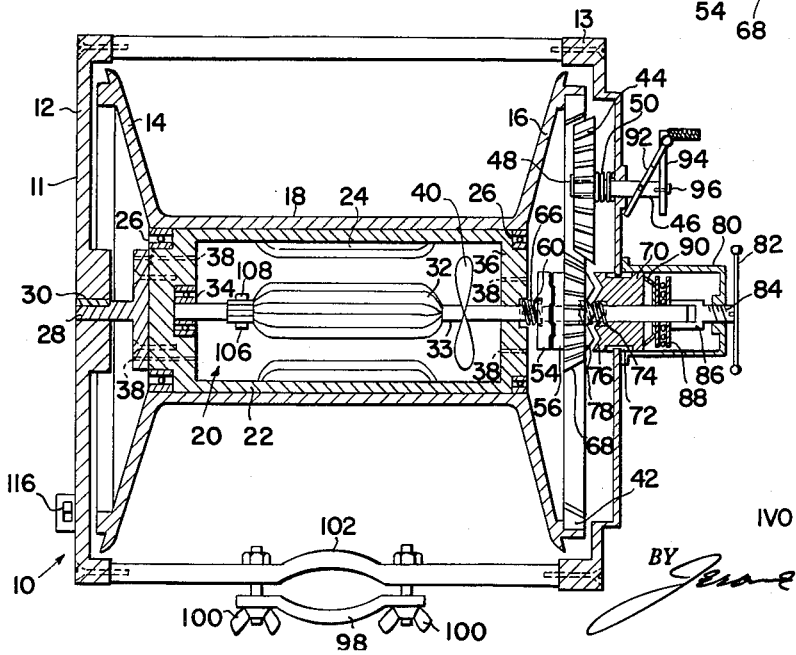

Other and further objects of my invention reside in the structures and arrangements hereinafter more fully described with reference to the accompanying drawings in which:

FIG. 1 is a sectional view of the motor driven fishing reel device constructed in accordance with the teaching of the invention with the parts thereof in their normal positions, FIG. 2 is an enlarged fragmentary sectional view of the clutch mechanism and brake shown in FIG. 1, FIG. 3 is a sectional view similar to FIG. 1 showing the brake thereof engaged, FIG. 4 is a sectional view showing the device in free wheeling condition, FIG. 5 is a right-hand side view of FIG. 1, FIG. 6 is a sectional view of FIG. 1 taken along lines 6—6, and FIG. 7 is a diagrammatic view of the motor circuit.

Referring now to the drawings, the fishing reel device there shown is generally identified by the numeral 10. Device 10 comprises a housing member 11 that includes a set of laterally spaced, but connected end walls 12 and 13 between which a reel or spool member 14 is mounted for rotation. The member 14 comprises a pair of radially outwardly diverging sides 16 connected together by a sleeve 18 to form a substantially spool-shaped structure that is adapted to have a fishing line (not shown) wound thereabout.

The spool member 14 is hollow along the axial length of its sleeve 18 to accommodate therein a motor generally identified by the numeral 20. Motor 20 comprises a field cover member 22 that has the motor windings 24 secured thereto. The cover member 22 mounts the member 14 for rotation thereabout at its oppositely disposed ends wherein there is fixed bearings 26. As illustrated in the drawings, the field cover member 22 is provided with any convenient structure, as the shaft 28 that is keyed at 30 to the wall 12 of the fishing reel housing 11 to prevent its rotation relative thereto.

Mounted for free rotation within the field cover member is an armature 32 having a shaft 33 which is bearingly mounted at 34 in a blind hole provided in the stationary cover member 22. The other end of the armature shaft 33 extends through and beyond the opposite, substantially closed wall 36 of the field cover member 22. Both of the ends walls of the member 22 are provided with a plurality of air vents 38 that permit cool air to be drawn into the interior of the motor 20 during the rotation of the armature shaft 33 having a fan member 40 mounted thereon. The air drawn into the motor by the combination of the air vents 38 and the fan 40 is sufficient to cool the motor during its operation.

Positioned between the motor 20 and the spool 14 is a transmission mechanism that serves to transmit the rotative movement of the motor shaft 33 to the spool 14 to rotate the same in response to the operation of the motor 20. Included in the transmission mechanism is a bevel-shaped ring gear 42 that is fixed to or formed as an integral part of one of the sides 16 of the member 14 and constitutes a portion of a gear train. Also included in the gear train of the transmission is an idler connecting gear 44 that is fixed for axial movement with a shaft 46 and for free rotation thereabout.

The idler gear shaft 46 is provided with a head 48 against which the connecting gear means 44 is seated as a result of the constant urging of a spring means 50 acting thereon. The spring means 50 abuts against the end wall 13 of the housing 11 and thus tends to constantly urge the idler connector gear 44 into transmitting engagement with the bevel ring gear 42. When the idler gear 44 is engaged with the bevel gear 42, it connects the same with a clutch mechanism that also forms a part of the transmission structure.

The clutch mechanism includes driving and driven clutch members 54 and 56 respectively. The driving clutch member 54 is conveniently keyed at 58 to the motor shaft 33 for rotation therewith and for limited axial movement relative therealong by the provision of a slot 60 in which the key 58 rides. Each of the driving and driven clutch members 54 and 56 is provided with axially disposed complementary arranged overload release clutch engaging surfaces 62 and 64 respectively. The clutch surfaces 62 and 64 are normally urged toward engagement with each other by the provision of a spring 66 positioned about the motor shaft 33 with its rear end in abutment with the wall 36 of the field cover member 22 and its forward end seated in abutment in an undercut provided in the driving clutch member 54. The spring 66, therefore, constantly urges the driving clutch member 54 into axial but yieldable driving engagement with the driven clutch member 56.

The driven clutch member 56 is mounted for idling or free rotation about the motor shaft 33 and for rotative movement relative to the driving clutch member 54 under conditions to be described. Although the driven clutch member 56 is freely rotatable about shaft 33, it is axially fixed thereon in radial alignment with the bevel-shaped ring gear 42. Positioned about or integrally formed on the exterior of the driven clutch member 56 and in radial alignment with the ring gear 42 is a bevel clutch gear 68. The bevel gear 68 completes the gear train of the transmission mechanism. Thus, when the idler gear 44 is in its normally engaged position as shown in FIGS. 1 and 3, it serves to connect the member 14 with the motor shaft 33 by way of the normally engaged clutch members 54 and 56, the clutch gear 68 and the ring gear 42.

From what has been described thus far, it will be recognized that upon the electrical operation of the motor means 20, the rotation of the shaft 33 will be transmitted from the driving clutch member 54 across to the driven clutch member 56 with which it is engaged, then by way of the clutch gear 68 to the normally engaged gear 44 and finally to the ring gear 42 to rotate the spool member 14 accordingly. Those skilled in the art will realize that in the event the motor 20 is so operated as to wind in the fishing line about the member 14, the clutch engaging surfaces 62 and 64 will remain constantly engaged for all normal driving purposes. However, it is important to provide for slippage between the motor and the reel in the event the force exerted by the fish caught on the line shall be greater than the winding force of the motor. That is to say, if the force that the fish exerts on the fishing line and applies to the spool 14 to unwind the same from the reel is greater in opposition to the force of rotation applied exerted on the reel by the motor 20 to wind the fishing line thereabout, the line will be caused to tear, or rupture or damage will be incurred to the fish.

To overcome this problem, the clutch engaging surfaces 62 and 64 are conveniently shaped as to permit the same to ride over each other when the aforedescribed overload condition occurs. Thus, when the force exerted by the fish on the reel to unwind the fishing reel therefrom exceeds in opposition the force to wind the fishing line about the spool as exerted by the motor, the spool 14 will be rotated in a direction reverse from the direction in which it is rotated by the motor. This reverse rotation is transmitted back to the idler gear 44 by way of the ring gear 42 and then to the clutch gear 68.

When this reverse rotation reaches the clutch gear 68, the driven clutch member 56 is caused to rotate in a reverse direction relative to the driving direction of rotation of the driving clutch gear 54. Accordingly, the clutch engaging surfaces 62 and 64 are caused to rotate relative to each other and during such relative rotation, the driving clutch member 54 is moved intermittently axially inward along the motor shaft 33 against the normal engaging urging of the spring 66. This overload release or overriding action of the clutch engaging surfaces 62 and 64 riding over each other disconnects the drive from the motor to the reel and also creates a loud chattering sound which immediately signifies to the fisherman that an overloading has occurred. In consequence, he will immediately stop the operation of the motor 20 to prevent the same from burning out. After so doing, he may then permit the fish to run out with the fishing line or he may apply a braking force to prevent the fish from running away with or unreeling the line from about the spool 14.

When the fisherman desires to halt or slow the unreeling of the line from about the spool 14, he need merely apply a restraining or braking force to some portion of the aforedescribed transmission mechanism. In the present invention the braking restraint is applied by an axially movable brake member 70 that is conveniently non-rotatably secured at 72 to the wall 13 of the housing 11. The securement structure 72, however, permits the brake member 70 to move axially into and out of engagement with the driven clutch member 56.

It will be noticed that a spring 74 normally urges the brake member 70 out of engagement with the clutch member 56. The brake 70 and the driven clutch member 56 are provided with complementary arranged teeth or braking surfaces 76 and 78 respectively that are inclined for overriding or releasable engagement. When it is desired to brake or slow the unreeling rotation of the member 14 after the motor 20 is stopped, the brake member 70 has its braking surface 76 moved into surface engagement with the braking surface 78 on the clutch member 56. This is done in opposition to the normal disengaging urging of the spring 74 therebetween.

Axial engaging operation of the brake member 70 is accomplished by a brake operator mechanism enclosed within an extension 80 mounted on the end wall 13 of the housing. The brake operator mechanism comprises a hand wheel 82 that is threaded at 84 in the extreme end of the housing extension 80 for relative axial movement therein. A shaft housing 86 formed integral with the hand wheel 82 is adapted to rotatably receive the extreme end of the motor shaft 33 and to be moved axially along such end of the motor shaft during the operation of the brake mechanism. Positioned between the shaft housing 86 and the brake member 70 is a thrust bearing 88 and a thrust spring 90.

By manipulation of the hand wheel 82 its housing 86 may be threaded further into the extension 80 for movement along the axially fixed motor shaft 33 to bear against the thrust bearing 88 and to resiliently force the brake member 70 into engagement with the driven clutch member 56. The thrust spring 90 interposed between the bearing 88 and the brake member 70 is sufficiently yieldable to permit the brake member 70 to move axially out of engagement with the driven clutch member 56 when an overload occurs.

Hence, under normal conditions as when the brake member 70 is engaged with the driven clutch member 56 along their complemental surfaces 76 and 78, the rotation of the spool 14 is braked since the transmission mechanism of which the driven clutch member forms a part is restrained from rotation. However, as previously described, if the fish should exert an unreeling force on the fishing line that exceeds or is greater in opposition than the braking force applied by the braking member 70 to the transmission mechanism, the driven clutch member 56 will be rotated thereby. Consequently its surface 78 will ride up and over the brake surface 76 to move the brake member 70 axially against the normal urging of the thrust spring 90.

The thrust spring thus permits the member 70 to move axially and to allow the driven clutch member 56 to rotate in a reverse or unwinding direction as the braking surfaces 76 and 78 override each other and intermittently release the braking force. As they override each other the surfaces emit a ratcheting sound that is audible to the fisherman. Once again the fisherman is provided with an indication that the fishing line may be ruptured or the mouth of the fish may be damaged, this time by the application of too great a braking force. He may then back off the brake member 70 or if the line is sufficiently strong, increase the braking force by further engaging rotation of the hand wheel 82.

At times it may be desired to permit the fish to "run out" with the fishing line. That is to say, the fisherman may want to give the fish all the line it desires to unwind from the member 14. To permit the running out of the line, the member 14 must be able to rotate freely and unhampered. This means that it must be completely disconnected from either the motor 20 or the brake 70 by way of the transmission mechanism interposed therebetween. To do this the idler shaft 46, on which the idler gear 44 is mounted, is axially movable in response to the operation of a free wheeling lever 92. The lever 92 is fork-shaped as shown more clearly in FIG. 5 and is pivoted on the shaft 46 adjacent to a raised portion or boss provided on the end wall 13 of the housing.

Thus, to lift or move the idler gear 44 out of connecting engagement between the ring gear 42 and the driven clutch gear 68, it is merely necessary to manually grasp the lever 92 and pivot the same away from the adjacent end wall 13 in a manner shown in FIG. 4. This pivoting movement causes the spaced or forked fingers of the lever to engage with the adjacent boss on the wall 13 while continued pivoting movement of the lever as shown in FIG. 4 opposes the normal urging of the spring 50 and actually forcibly slides the shaft 46 axially outward through the end wall and through the adjacent boss on which the lever 92 fulcrums. Only slight pivoting and fulcruming movement of the lever 92 is necessary to disengage the idler gear 44 from between the ring gear 42 and the clutch gear 68 thereby disconnecting the spool 14 from either the driving motor 20 or the brake 70.

Since the free wheeling operation is generally of short duration, the fisherman may manually retain the lever 92 in its pivoted disengaging position as shown in FIG. 4. However, when the fisherman desires, he may immediately connect the member 14 with the motor 20 or the brake means 70 through the transmission mechanism by simply releasing the fulcruming hand pressure on the lever 92. The idler gear 44 then automatically returns to its normally engaged or connecting position to complete the gear train by virtue of the normal urging of the spring member 50 acting thereon.

At times it is desired, more especially in the event of electrical power failure, to permit alternative manual rotation of the spool member 14. In the present invention a hand crank member 94 is mounted on the idler shaft 46 to permit the same to be connected with the reel by way of the transmission mechanism. Because the need for hand cranking of the member 14 very rarely occurs, and then only in the event of power failure, provision must be made to permit the crank to be removed from or connected to the shaft 46 when the need for the same arises.

Referring to the figures of the drawings, it will be noted that the crank member 94 may be removably connected to the shaft 46 of the transmission mechanism by the simple tightening application of a lock screw 96 threadable into the end thereof. Thus, the crank may be readily applied to the idler shaft 46 of the transmission mechanism when the need for the same arises. In some instances it has been found that it is desirable not to remove the hand crank member 94 completely from the fishing reel device 10, but rather permit the same to remain in position thereon ready for use when it is required. However, to insure that the hand crank member 94 will not continuously rotate with the idler gear 44 in the event its rotation is transmitted to its shaft 46, it is merely necessary to back off or unscrew the lock screw 96 a turn or two thereby permitting the hand crank member 94 to be inactively connected to the idler shaft 46, but nevertheless, immediately available and ready for use.

The complete fishing reel device 10 may be conveniently applied to any fishing pole or rig by any convenient structure as a clamping plate 98 that is releasably connected by wing nuts 100 to the device 10. The fishing reel device 10 may be securely clamped to any pole or rig by the application of thumb tightening pressure on the wing nuts 100 to clamp the pole between the plate 98 and the adjacent correspondingly curved surface 102 of the device.

Referring to FIG. 7, the field 24 of the motor 20 is connected by a line 104 to the positive side of any available source of power. On fishing vessels the battery 105 may constitute such source of power. The other side of the field is secured to a brush 106 that bears against the commutator of the armature 32. The other brush 108 operating off the commutator is grounded at 110 while the negative side of the battery is connected by a line 112 to a ground 114 with a manually operable switch 116 interpositioned therein. The switch 116 may be mounted on any desired portion of the housing 11 for convenient and ready operation by the fisherman. In the present invention the same is shown located on the end wall 12 of the housing 11 for operation by the left hand of the fisherman.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a fishing reel device, a spool, an electrically operated motor mounted for coaxial rotation within said spool to rotate the same, means between said motor and spool to rotate the spool in response to the operation of said motor, said means including clutch means to connect said spool with said motor for rotation thereby, brake means engageable with said clutch means to brake the rotation of said spool, hand crack means releasably connectible with said means between said motor and spool to enable rotation of said spool by hand.

2. In a fishing reel device, a spool, electric motor means mounted for coaxial rotation within said spool to rotate the same, means to transmit the rotation of said motor means to said spool including gear means and driving and driven clutch means, said driving clutch means being rotatable with said motor means, said driving and driven clutch means having means thereon engageable to transmit the rotation from said motor to said spool by way of said driving clutch means, said driven clutch means having means releasably engageable with said gear means to interrupt the transmission of rotation from said motor to said spool.

3. In a fishing reel device, rotatable electrical motor means, a spool adapted to be rotated by and housing said motor means for coaxial rotation therewithin to wind a fishing line thereabout, means to transmit the rotation from said motor means to said spool including driving and driven clutch means, said driving and driven clutch means each having engageable overload release means thereon disengageable to interrupt the rotation from said motor means to said spool when an unwinding force exerted on the spool by way of the fishing line thereabout is greater than the rotative winding force of said motor means, and braking means operable for engagement with said driven clutch means to apply a force thereto to break the rotation of said spool.

4. In a fishing reel as in claim 3, said braking means and said driven clutch means each having surface means thereon engageable to apply said braking force to brake the rotation of said driven clutch means and said spool and automatically disengageable to permit said spool to rotate when the unwinding force applied to said spool is greater than the braking force.

5. In a fishing reel device as in claim 3, means releasably connectible with said transmission means to enable the rotation of said spool by hand.

6. In a fishing reel device, an operable electrical motor having a rotatable shaft, a spool bearingly mounted about and for rotation by said motor, transmission means between said motor and spool to rotate the latter in response to the rotation of said motor and shaft, said transmission means including driving and driven clutch means each having means thereon releasably engageable to releasably transmit the rotation from said motor and shaft to said spool, and selectively operable means included in said transmission means and connectible with said driven clutch means to complete the rotative transmission from said motor and shaft to said spool.

7. In a fishing reel device as in claim 6, brake means operable to apply a force to said transmission means to brake the rotation of the same and said spool.

8. In a fishing reel device as in claim 7, said brake means and driven clutch means having means for releasable engagement to apply said braking force to said driven clutch means and to permit said driven clutch means to rotate when a rotative force applied to said spool is greater in opposition than the braking force.

9. In a fishing reel device as in claim 7, means releasably connectible with said selectively operable means to enable manual rotation of said spool thereby when said selectively operable means completes said rotative transmission.

10. In a fishing reel device, an electrical motor having a rotatable shaft, a spool rotatable coaxially about said motor, a driving clutch member rotatable with said shaft, a driven clutch member, said driving and driven clutch members having means engageable to transmit the rotation of said shaft to said driven clutch member and releasably engageable when a rotation applied to said spool is greater in opposition than the rotation applied by said motor, means to connect said driven member with said spool, and brake means to contact the rotation of said spool, said brake means and driven member having means engageable to brake said driven member and being releasably engageable when a rotative force applied to said spool is greater in opposition than the braking of said brake means.

11. In a fishing reel device as in claim 10, means normally urging said driving clutch member into driving engagement with said driven clutch member, and means normally urging said brake means from engagement with said driven clutch member.

12. In a fishing reel device as in claim 10, hand crank means releasably connectible with said means to connect said driven member with said spool to manually rotate said spool.

13. In a fishing reel device, a spool adapted to have a fishing line wound thereabout, an electrically operated motor mounted for coaxial rotation within said spool, means to transmit the rotation from said motor to said spool, said transmission means including a train of gears having an idler gear selectively operable to connect and disconnect the transmission of rotation from said motor to said spool and driving and driven clutch means including means engageable to transmit rotation from said motor to said spool and releasably engageable to interrupt their transmission of rotation from said motor to said spool when a rotation applied to said spool is greater in opposition than that applied by said motor.

14. In a fishing reel device as in claim 13, brake means cooperable with said clutch means to brake the rotation of said spool.

15. In a fishing reel device as in claim 14, hand crank means connectible with said idler gear to rotate the same and said spool by hand when said idler gear is operated to connect the transmission of rotation from said motor to said spool.

References Cited in the file of this patent
UNITED STATES PATENTS

| | | | |
|---|---|---|---|
| Re. 20,995 | Beasley | | Feb. 7, 1939 |
| 390,752 | Cashin | | Oct. 9, 1888 |
| 829,854 | Dexter | | Aug. 28, 1906 |
| 1,580,986 | Aberson | | Apr. 13, 1926 |
| 2,190,398 | Bugatti | | Feb. 13, 1940 |
| 2,262,671 | Fanshier | | Nov. 11, 1941 |
| 2,609,160 | Van Sciver et al. | | Sept. 2, 1952 |
| 2,672,217 | Sarah | | Mar. 16, 1954 |